US012241285B2

(12) United States Patent
Pohlmann

(10) Patent No.: US 12,241,285 B2
(45) Date of Patent: Mar. 4, 2025

(54) CLOSING DEVICE FOR MOVABLE FURNITURE PARTS AND METHOD FOR LOCKING AT LEAST ONE MOVABLE FURNITURE PART

(71) Applicant: Paul Hettich GmbH & Co. KG, Kirchlengern (DE)

(72) Inventor: Volker Pohlmann, Herford (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 86 days.

(21) Appl. No.: 18/031,681

(22) PCT Filed: Oct. 5, 2021

(86) PCT No.: PCT/EP2021/077357
§ 371 (c)(1),
(2) Date: Apr. 13, 2023

(87) PCT Pub. No.: WO2022/078807
PCT Pub. Date: Apr. 21, 2022

(65) Prior Publication Data
US 2023/0383576 A1 Nov. 30, 2023

(30) Foreign Application Priority Data
Oct. 17, 2020 (DE) ..................... 10 2020 127 404.1

(51) Int. Cl.
*E05B 65/464* (2017.01)

(52) U.S. Cl.
CPC .................................. *E05B 65/464* (2013.01)

(58) Field of Classification Search
CPC .... E05B 65/462; E05B 65/463; E05B 65/464; E05B 65/465; E05B 65/466; A47B 88/50; A47B 2097/008
See application file for complete search history.

(56) References Cited

U.S. PATENT DOCUMENTS 3,404,929 A * 10/1968 Wright .................. E05B 65/463 312/216
3,866,993 A * 2/1975 Dean ..................... E05B 65/463 312/216

(Continued)

FOREIGN PATENT DOCUMENTS

DE 24 12 114 A1 4/1975
DE 36 33 256 A1 3/1988

(Continued)

OTHER PUBLICATIONS

International Search Report in PCT/EP2021/077357, mailed Jan. 17, 2022.

(Continued)

*Primary Examiner* — Andrew Roersma
(74) *Attorney, Agent, or Firm* — Collard & Roe, P.C.

(57) ABSTRACT

A locking device for movable furniture parts comprises a guide rail with a plurality of blocking elements that is held displaceably along the guide rail, wherein each blocking element comprises a run-up-slope which can be contacted by an activator attached to a movable furniture part, and each locking element has a wall which can form a stop for the activator in order to lock the movable furniture part with the activator in a closed position. The guide rail moves between an anti-tipping position, in which all activators are arranged adjacent to a run-up slope on different blocking elements, and a blocking position, in which all activators arranged in the closed position are arranged adjacent to a wall on different blocking elements. In the anti-tipping position the guide rail is displaceable into the blocking position and is held in the blocking position via a holding device.

15 Claims, 17 Drawing Sheets

(56) References Cited

U.S. PATENT DOCUMENTS

| | | | |
|---|---|---|---|
| 5,931,548 | A | 8/1999 | Bischoff |
| 9,068,378 | B2 | 6/2015 | Milani et al. |

FOREIGN PATENT DOCUMENTS

| | | | | | |
|---|---|---|---|---|---|
| DE | 20301340 | U1 | * | 4/2003 | ............. A47B 88/00 |
| DE | 10 2004 050 619 | B3 | | 5/2006 | |
| DE | 10 2005 054 006 | B4 | | 1/2008 | |
| DE | 20 2009 000 050 | U1 | | 6/2010 | |
| DE | 202010008837 | U1 | * | 2/2011 | ............. A47B 88/43 |
| DE | 202013009168 | U1 | * | 12/2013 | ........... E05B 65/462 |
| EP | 1002918 | A1 | * | 5/2000 | ........... E05B 65/464 |
| EP | 2 210 525 | A2 | | 7/2010 | |
| EP | 2 239 402 | A2 | | 10/2010 | |
| EP | 2354393 | A1 | * | 8/2011 | ........... A47B 88/463 |
| EP | 2 862 993 | A2 | | 4/2015 | |
| KR | 20-0359980 | Y1 | | 8/2004 | |
| KR | 10-0767096 | B1 | | 10/2007 | |
| WO | 2018/106167 | A1 | | 6/2018 | |

OTHER PUBLICATIONS

German Search Report dated Jun. 30, 2021 in German Application No. 10 2020 127 404.1 with English Translation of relevant parts.

International Search Report in PCT/EP2021/077359, mailed Jan. 19, 2022.

German Search Report dated Jun. 30, 2021 in German Application No. 10 2020 127 403.3 with English Translation of relevant parts.

* cited by examiner

CLOSING DEVICE FOR MOVABLE FURNITURE PARTS AND METHOD FOR LOCKING AT LEAST ONE MOVABLE FURNITURE PART

CROSS REFERENCE TO RELATED APPLICATIONS

This application is the National Stage of PCT/EP2021/077357 filed on Oct. 5, 2021, which claims priority under 35 U.S.C. § 119 of German Application No. 10 2020 127 404.1 filed on Oct. 17, 2020, the disclosure of which is incorporated by reference. The international application under PCT article 21(2) was not published in English.

BACKGROUND OF THE INVENTION

The present invention relates to a locking device for movable furniture parts, comprising a guide rail with a plurality of blocking elements that are held displaceably along the guide rail, wherein each blocking element comprises a run-up slope which can be contacted by an activator attached to a movable furniture part and each blocking element comprises a wall which can form a stop for the activator in order to lock the movable furniture part with the activator in a closed position, wherein the guide rail with the blocking element can be moved between an anti-tipping position, in which all activators are arranged adjacent to a run-up slope on different blocking elements, and a blocking position, in which all activators arranged in the blocking position are arranged adjacent to a wall on different blocking elements, and a method for locking at least one movable furniture part to a furniture body with a locking device.

DE 20 2009 000 050 U1 discloses a locking system for extendable furniture parts, in which a locking bar with a plurality of sliding parts is provided. A movable furniture part acts on a driver which engages with one of the sliding parts in order to move the sliding parts from an unlocking position to a locking position. The driver is slidably mounted on a housing and can be coupled with a movable furniture part over a short distance. The interposition of such a driver between the movable furniture part and the locking bar means increased manufacturing and assembly costs.

DE 10 2005 054 006 B4 discloses a pull-out safety device for extendable furniture elements in which a plurality of blocking elements can be displaced along a linear guide. The blocking elements can be moved by means of a bolt which is attached to a movable furniture element. The latch is strip-shaped and extends over almost the entire length of the furniture element. Here, too, the constructional effort is disadvantageous because of the great length. In addition, the pointed ends of the bars can easily be damaged.

SUMMARY OF THE INVENTION

It is therefore an object of the present invention to provide a locking device for movable furniture parts and a method for locking at least one movable furniture part to a furniture body, which is simply constructed and enables effective locking of the furniture parts in a closed position when one of the movable furniture parts is in an open position.

In the locking device according to the invention, a plurality of blocking elements is held displaceably along a guide rail, wherein each blocking element comprises a run-up slope which can be contacted by an activator attached to a movable furniture part. Each locking element also comprises a wall which can form a stop for the activator in order to lock the movable furniture part with the activator in a closed position. The guide rail with the blocking elements can thereby be moved between an anti-tipping position, in which all activators are arranged adjacent to a run-up slope on different blocking elements, and a blocking position, in which all activators arranged in the closed position are arranged adjacent to a wall of different blocking elements. According to the invention, in the anti-tipping position, when an activator is moved against a run-up slope, the guide rail can be displaced into the blocking position, in particular in the longitudinal direction of the guide rail, and then held in the blocking position via a holding device. This eliminates the need to hold the blocking elements via the activator over the entire opening movement of the movable furniture part, but instead the activator can displace the guide rail into a blocking position when moving against the run-up slope, thereby locking all other movable furniture parts in a closed position. The holding device holds the guide rail in this blocking position until the furniture part that is in the opening position is moved back into the closed position and thereby the guide rail is unlocked by the holding device so that the guide rail is again arranged in the anti-tipping position. This eliminates the need to provide a driver between the movable furniture part and the blocking elements, which is coupled to the movable furniture part over a certain distance. The activator can be moved together with the movable furniture part, in particular the activator can also be fixed directly to the movable furniture part. This reduces the number of necessary components for the locking device and enables a simple actuation in which the activator can be compact.

Preferably, the holding device holds the guide rail in the blocking position in a form-locking/fitting and/or force-locking/fitting manner, in particular in a clamping or latching manner. This enables the guide rail to be easily fixed using clamping elements or latching elements, such as latching webs, latching receptacles or latching projections. The use of magnetic holding means is also possible here to create an almost wear-free holding device.

In a preferred embodiment, the guide rail can be moved from the blocking position into the anti-tipping position via an activator which is moved from the opening position in the closing direction with the movable furniture part, whereby the activator can then be moved along a guide slope on a blocking element. Via the guide slope, the blocking element can then release the guide rail from the blocking position and then move it into an anti-tipping position. The guide slope can be arranged on the opposite side of a blocking element to the run-up slope, whereby the term "opposite" refers to the direction of movement of the activator, which is moved against the run-up slope during a movement on the movable furniture part in the opening direction and is moved against the guide slope during an opposite movement in the closing direction.

Preferably, the blocking elements are biased into a raised position by a force accumulator. When the guide rail is moved from the blocking position to the anti-tipping position, the activator can move at least part of the blocking elements into a lowered position against the force accumulator by means of an activator that can be moved along the guide slope. The blocking elements can be pre-tensioned against an end stop on the guide rail via the force accumulator, so that the blocking elements are displaced along the guide rail via the activator, irrespective of whether the activator is moved against the run-up slope or the guide slope. This allows at least some of the blocking elements to be displaced, forming a gap through which the activator can then be passed. After the activator is out of engagement with the blocking elements, the force accumulator can automatically move the blocking elements back to a closed position and close the gap created by the activator again. The force accumulator can be supported on one side by a stop that is fixed to the guide rail and can be supported on the opposite side of one of the blocking elements or on a component between the blocking elements and the other end of the force accumulator. The force accumulator can be designed as a separate spiral, shape (biscuit joiner) or leaf spring or integrally as an elastic element on a stop of the guide rail.

Preferably, a latching mechanism is provided by means of which the guide rail is latched in a raised position. This leads to greater safety during operation. The latching mechanism can, for example, comprise a heart-shaped curve or a latching web which ensures that the guide rail is secured in a raised blocking position.

Each blocking element preferably comprises a channel-shaped receptacle through which an activator can be passed without moving the blocking elements. This channel-shaped receptacle can be used to move the locking device into a release position in which all activators are arranged adjacent to a channel-shaped receptacle so that all movable furniture parts are also moved simultaneously in the opening direction. This release position is useful if the movable furniture parts are to be removed for disassembly, for example during assembly, for cleaning or for moving house.

A switching mechanism, in particular a lock, on the locking device can therefore have three positions, the release position, in which all movable furniture parts can be moved in the opening direction, the anti-tipping position, in which only one of the movable furniture parts can be moved in the opening direction at a time, and a locking position, in which all movable furniture parts are locked in the closed position.

Preferably, each activator is designed as a pin that can be fixed to the movable furniture part. The pin can, for example, be directly fixed in a side wall or side frame of the movable furniture part. Alternatively, the movable furniture part and the activator can also be fixed to each other via holders or other components, for example via the pull-out guide.

Workshop, surgery/business or laboratory furnishings for which the installation/use of movable drawers or pushing elements is intended are exemplarily understood as furniture according to the invention.

In the method according to the invention for locking at least one movable furniture part to the furniture body, a first movable furniture part is first moved from a closed position into an opening direction, an activator held on the furniture part being moved against a run-up slope on a blocking element held on a guide rail, the blocking element moving the guide rail from an anti-tipping position into a locking position in which all other movable furniture parts, except the first furniture part, are locked in the closed position. The guide rail is then held in the locking position by a holding device, wherein the blocking elements block a movement of at least one second furniture part, in particular all other parts except the first furniture part, from the closed position in the opening direction. The holding device can hold the guide rail in the locking position in a form-locking/fitting and/or force-locking/fitting manner, in particular in a clamping or latching manner. In a next step, the first furniture part is moved back into the closed position, whereby the activator on the first furniture part is moved against a guide slope on a blocking element in order to release the guide rail from the locking position and move it into the anti-tipping position, in which a movable furniture part can be moved in the opening direction. The movement of the blocking elements via the activator is thus used to move the guide rail from an anti-tipping position into a locking position and to hold it there, which makes it possible to move the activator in an opening area independently of, in particular at a distance from, the locking device. Only when the activator is moved in the closing direction, shortly before the closed position, can the activator move the guide rail again from the closed position to the anti-tipping position via a blocking element.

Preferably, when the activator is moved on the first furniture part against the run-up slope, at least some of the blocking elements are displaced against a force accumulator along the guide rail. The blocking elements can thereby form a gap to guide the activator through two adjacent blocking elements. This movement of the blocking elements against the force accumulator can allow a brief gap to be formed between two adjacent blocking elements for the activator to pass through. During this movement, the guide rail is simultaneously moved into a blocking position and can be held there in a latching or clamping manner until the activator is moved again in the closing direction.

Preferably, when the activator on the first furniture part moves against the guide slope, i.e. during a closing movement, at least some of the blocking elements are displaced along the guide rail against a force accumulator in order to then displace the guide rail from the locking position into the anti-tipping position. Even when the activator is returned from the opening position in the closing direction, a gap can thus be formed between two adjacent blocking elements via the guide slope, through which the activator can be passed. When the blocking elements are moved, the latching or clamping fixation of the guide rail is re-leased in order to move it into the anti-tipping position.

The invention is explained in more detail below by means of several embodiments with reference to the accompanying drawings. They show:

DETAILED DESCRIPTION OF THE EMBODIMENTS

Figure 1:
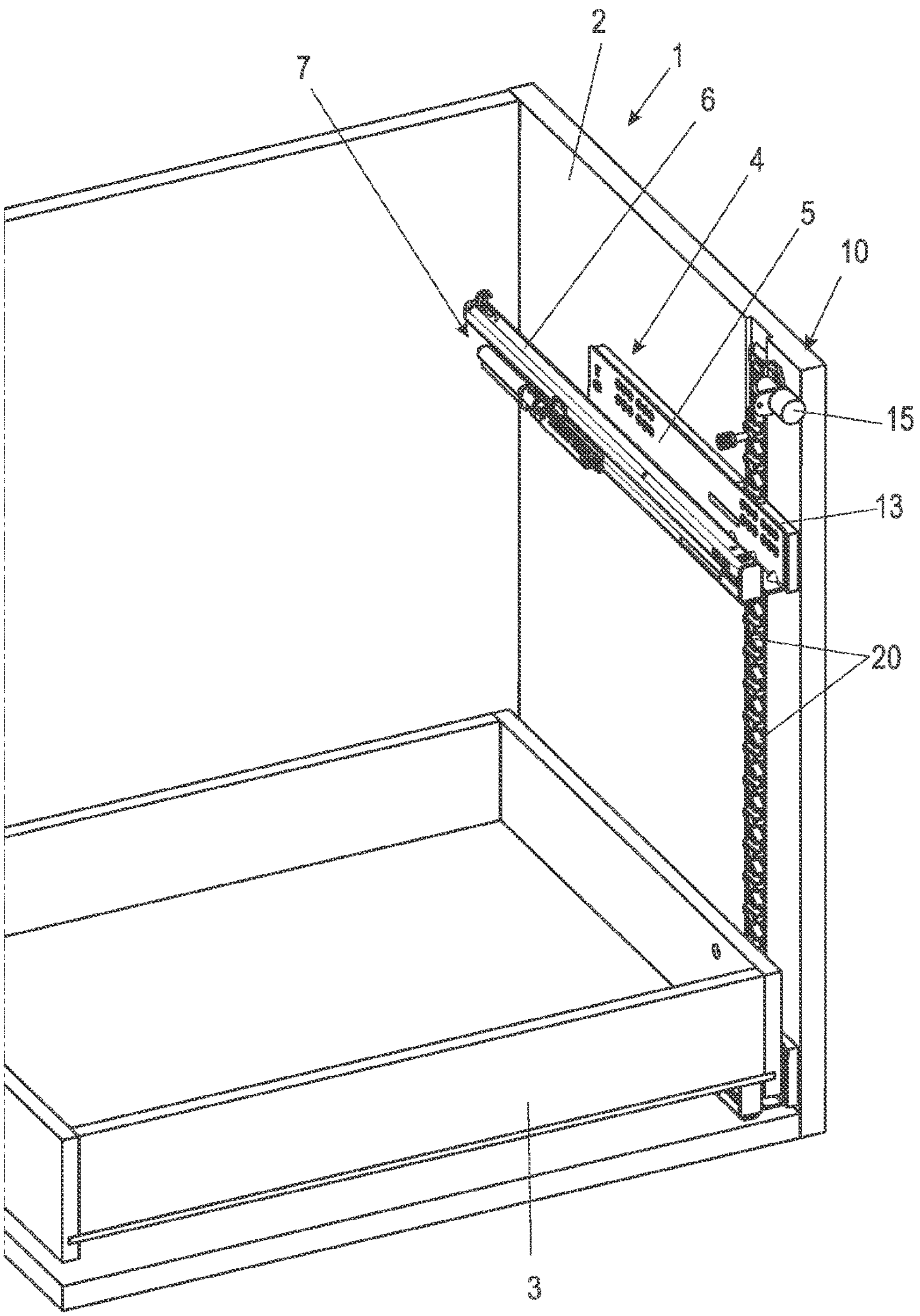
FIG. 1 a perspective view of a piece of furniture with a locking device according to the invention.

A piece of furniture 1 comprises a furniture body 2 on which pull-out guides 4 are fixed to opposite side walls.

Each pull-out guide 4 comprises a stationary rail 5 and a movable runner 6, between which there may optionally be at least one central runner extending the length of the drawer. A self-closing device 7 and/or an ejecting device, also in combination with damping systems, can be provided on the pull-out guide 4 in order to pull in or eject a movable furniture part 3 in the form of a drawer.

A locking device 10 for movable furniture parts 3 is provided on at least one side wall of the furniture body 2, by means of which it can be controlled whether or not a movable furniture part 3 can be moved into an opening position via the pull-out guide 4.

Figure 2:
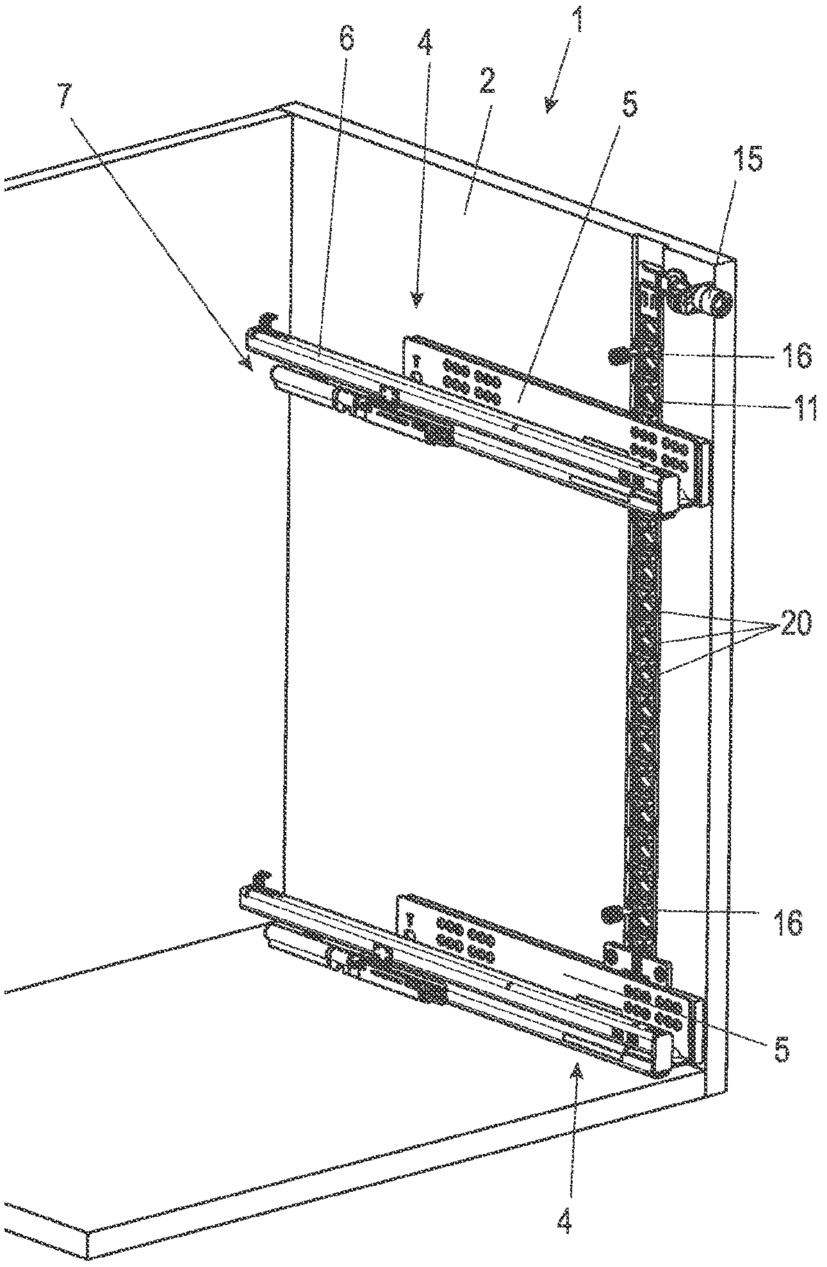
FIG. 2 a view of the furniture of FIG. 1 without the push element.
Figure 3:
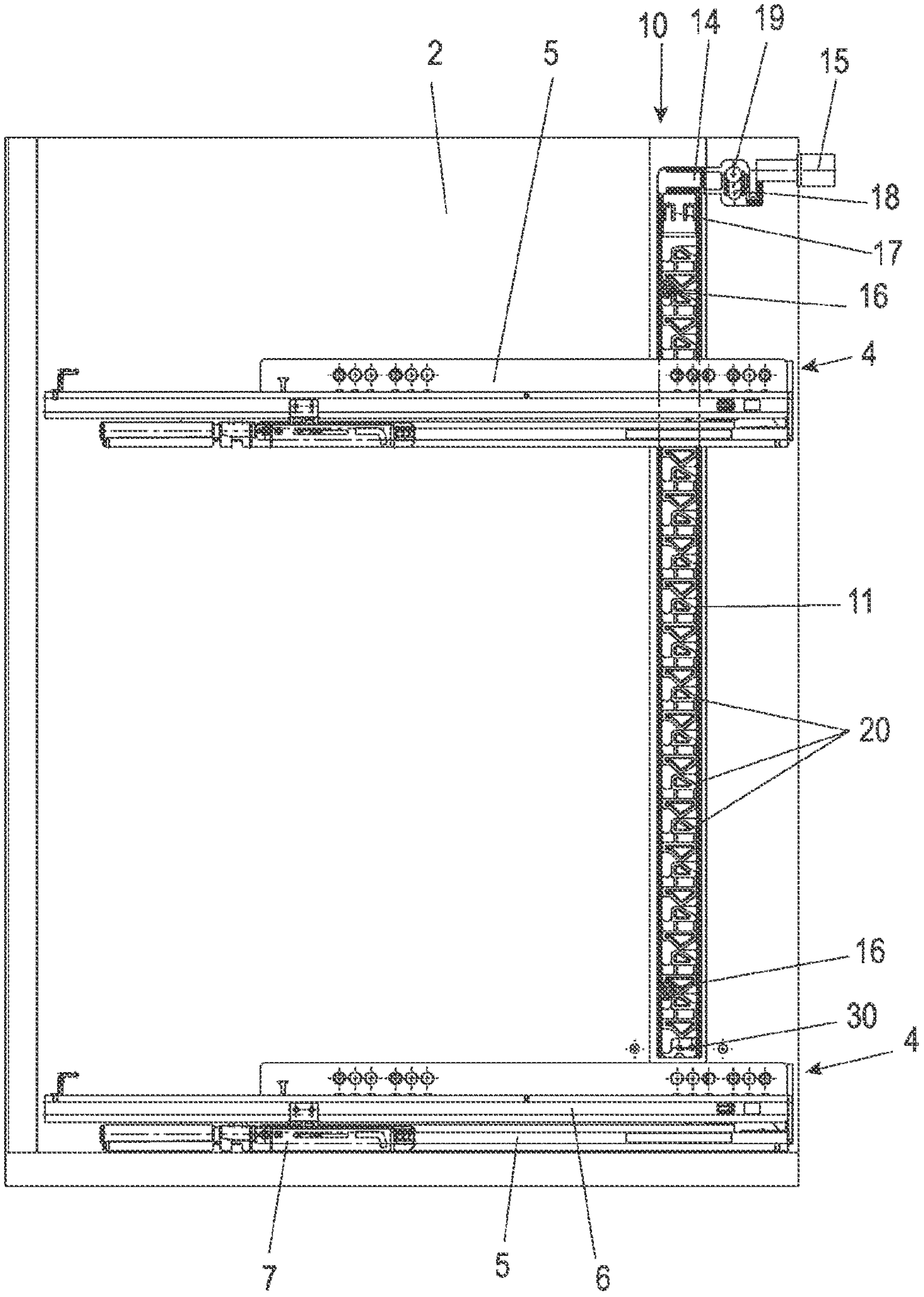
FIG. 3 a side view of the furniture of FIG. 1.

The locking device 10 comprises a guide rail 11 which is inserted into a groove 12 on the side wall of the furniture body 2 and which can be moved in the vertical direction by means of a switching mechanism 15. The guide rail 11 extends over several pull-out guides 4, as shown in FIGS. 2 and 3. Only two pull-out guides 4 are shown, although more than two pull-out guides 4 can also be mounted on a side wall of the furniture body 2.

Figure 4:
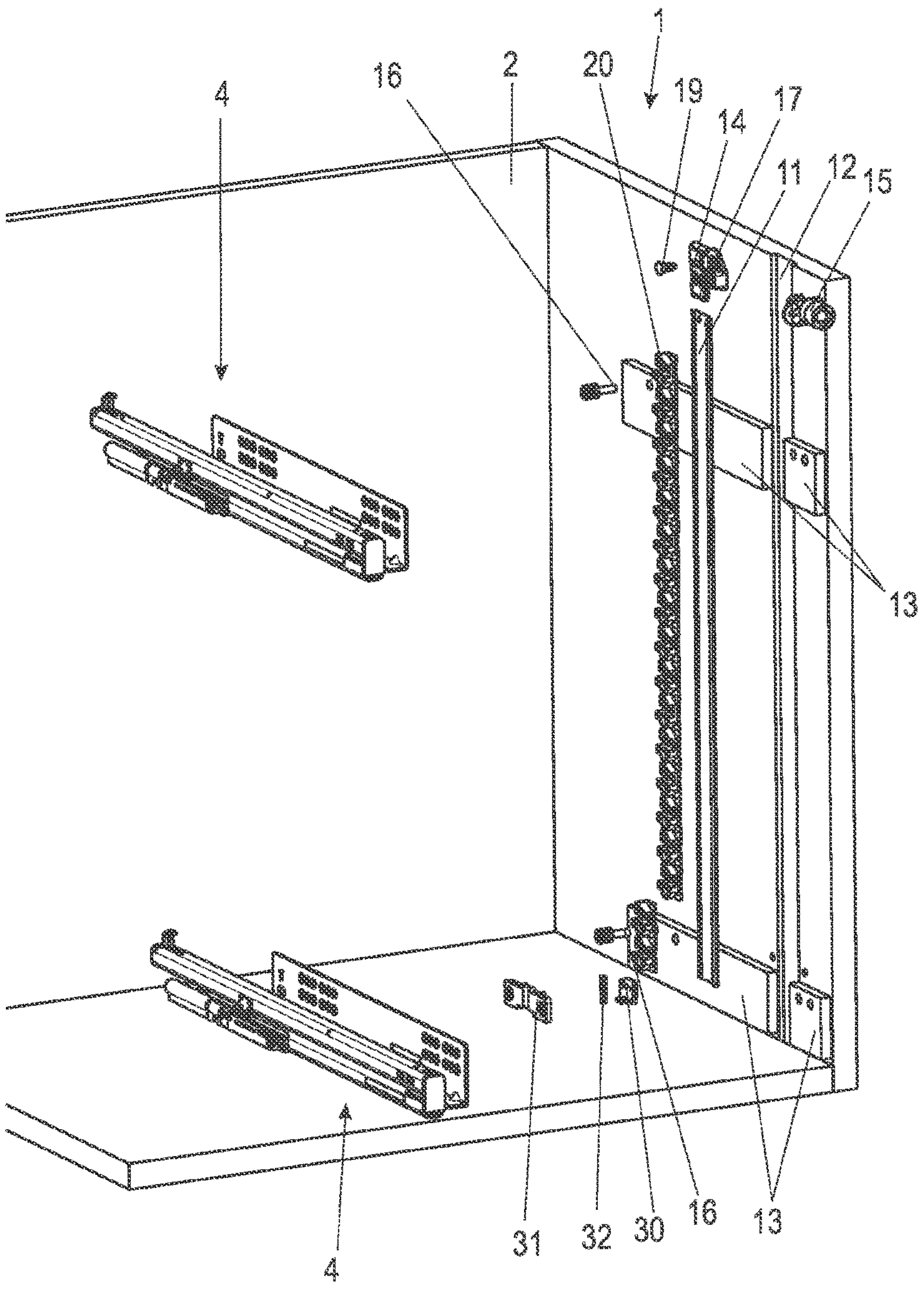
FIG. 4 an exploded view of the furniture of FIG. 2.

As shown in FIG. 4, the stationary rails 5 of the pull-out guide are not mounted directly on the side wall, but via the interposition of a spacer 13, in particular a plate. The spacer 13 has a recess in the area of a groove 12 for the guide rail 11. A large number of blocking elements 20, which are made of plastic or met-al, for example, are held displaceably in the guide rail 11. The blocking elements 20 are movable in the mounted position, and the stationary rail 5 is pre-vented from blocking the blocking elements 20 via the spacers 13. It is also possible to dispense with the spacers 13 by making the groove 12 deeper or by using flat blocking elements 20 in the area of the stationary rails. In addition, a groove 12 can also be dispensed with if the guide rail 11 is guided via other guide elements in the area of the side wall of the furniture body 2, in particular linear bearings, instead of in a groove 12.

The switching mechanism 15 comprises a rotatable knob by means of which a connecting element 14, which is mounted on a pin 19 in an elongated hole 18, can be moved in the vertical direction. The guide rail 11 can be raised or lowered via the connecting element 14. A stop 30 is provided in the lower area of the guide rail 11 (FIG. 3), which ensures that the blocking elements 20 are moved together with the guide rail 11.

A pin-shaped activator 16 is fixed directly or indirectly to each movable furniture part 3 and can be engaged with a blocking element 20. The activators 16 are moved together with the movable furniture part 3. An activator 16 is not assigned to each blocking element 20, so that some of the blocking elements 20 are only designed as spacers and can optionally also be designed with a different shape than the blocking elements 20 that can be coupled with an activator.

A stop 30 is fixed to the guide rail 11 in the lower area, on which a force accumulator 32, in the form of a spring, is supported. The force accumulator 32 and the stop 30 are secured by a clamp 31, which is fixed to the side wall of the furniture body 2. The stop 30 and the force accumulator 32 can be moved relative to the clamp 31.

Figure 5A:
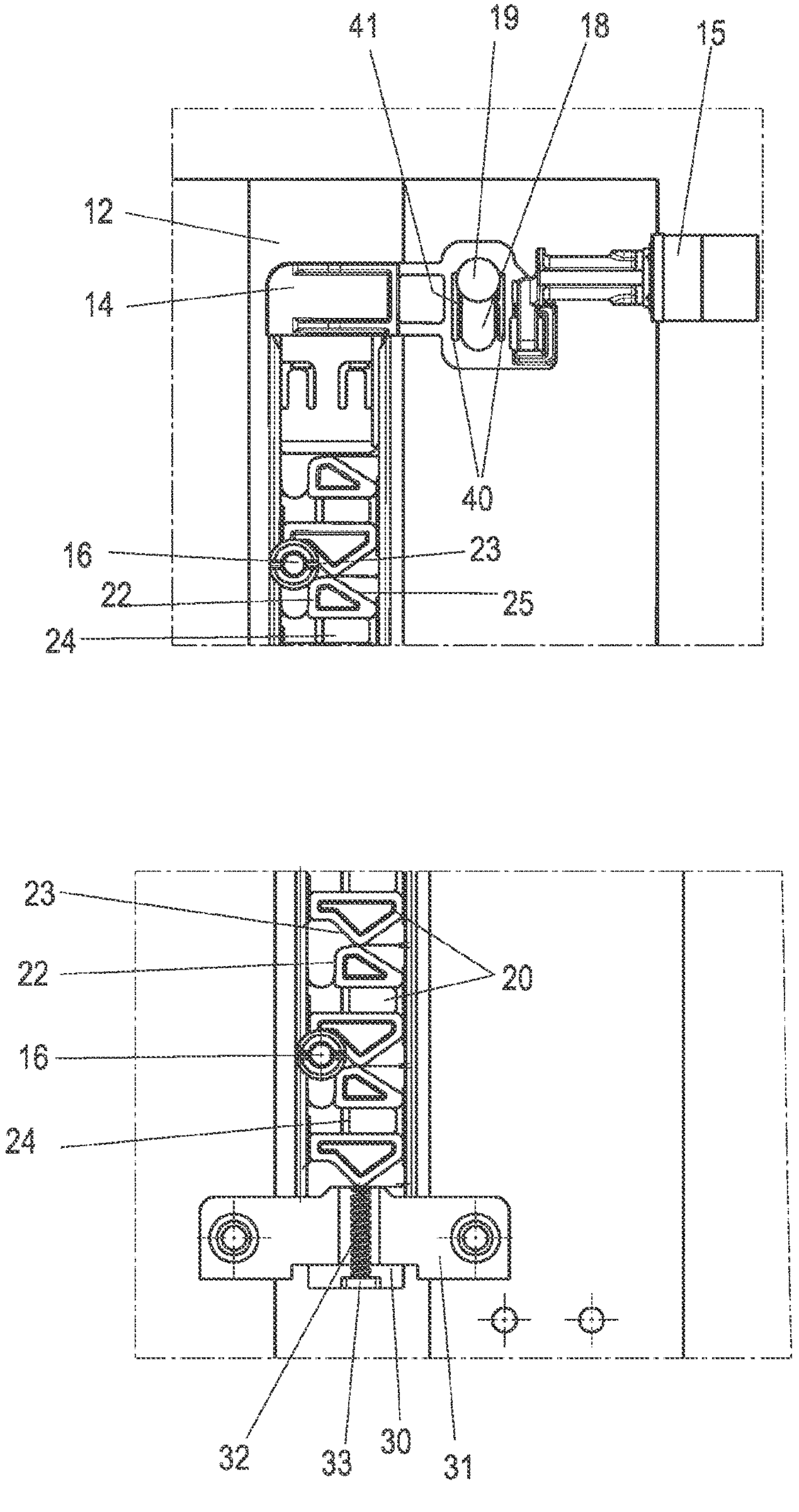
FIGS. 5A and 5B two detailed views of the locking device in an anti-tipping position.
Figure 5B:
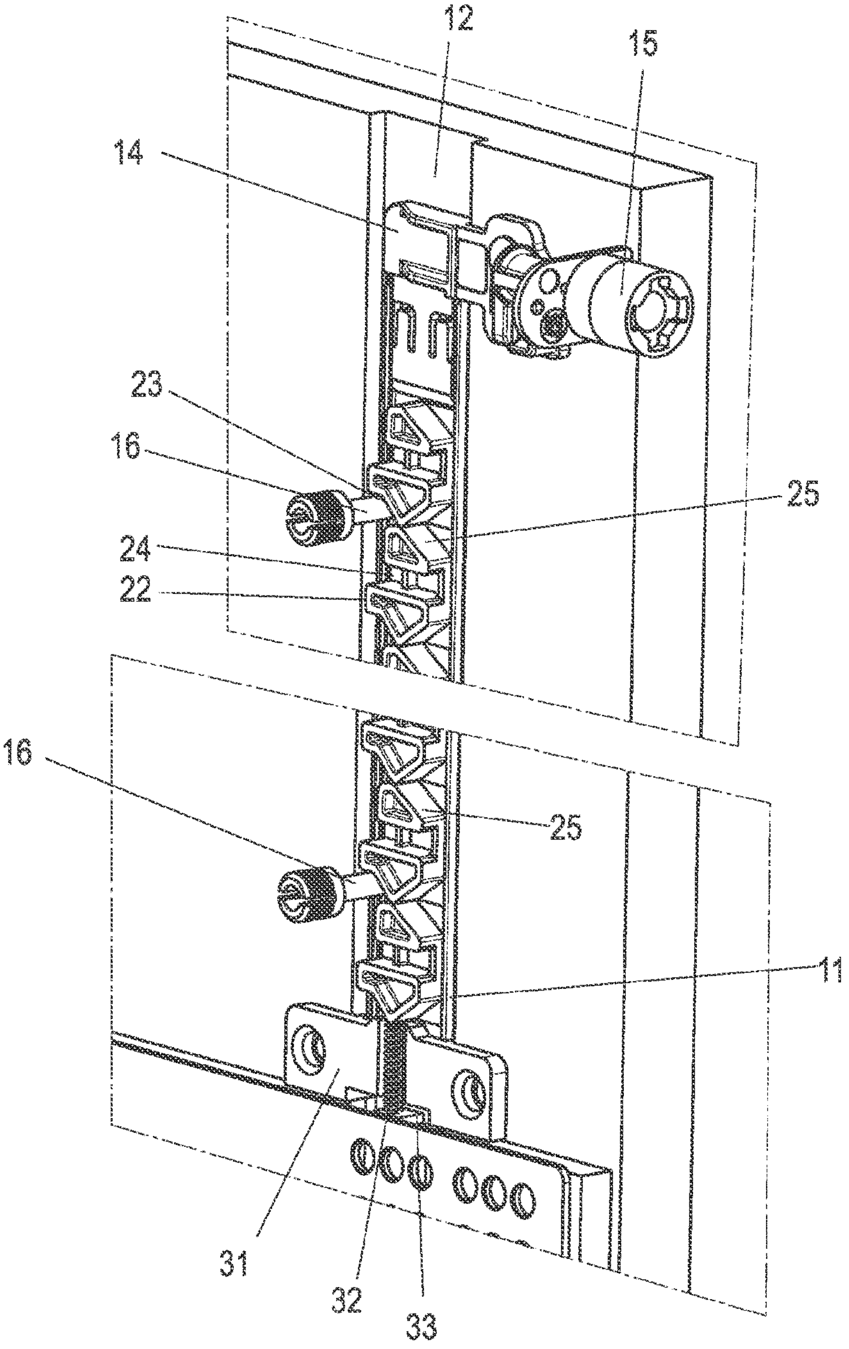

FIGS. 5A and 5B show the locking device 10 in detail, which is arranged in an anti-tipping (tip protection) position for the furniture 1. In the anti-tipping position, all activators 16, which may be fixed to a movable furniture part 3, for example to a side wall of a drawer, are located adjacent to a run-up slope 23 on a blocking element 20, each activator 16 being assigned a different blocking element 20. In the anti-tipping position, only one of the movable furniture parts 3 can be moved in the opening direction at a time.

Figure 6:
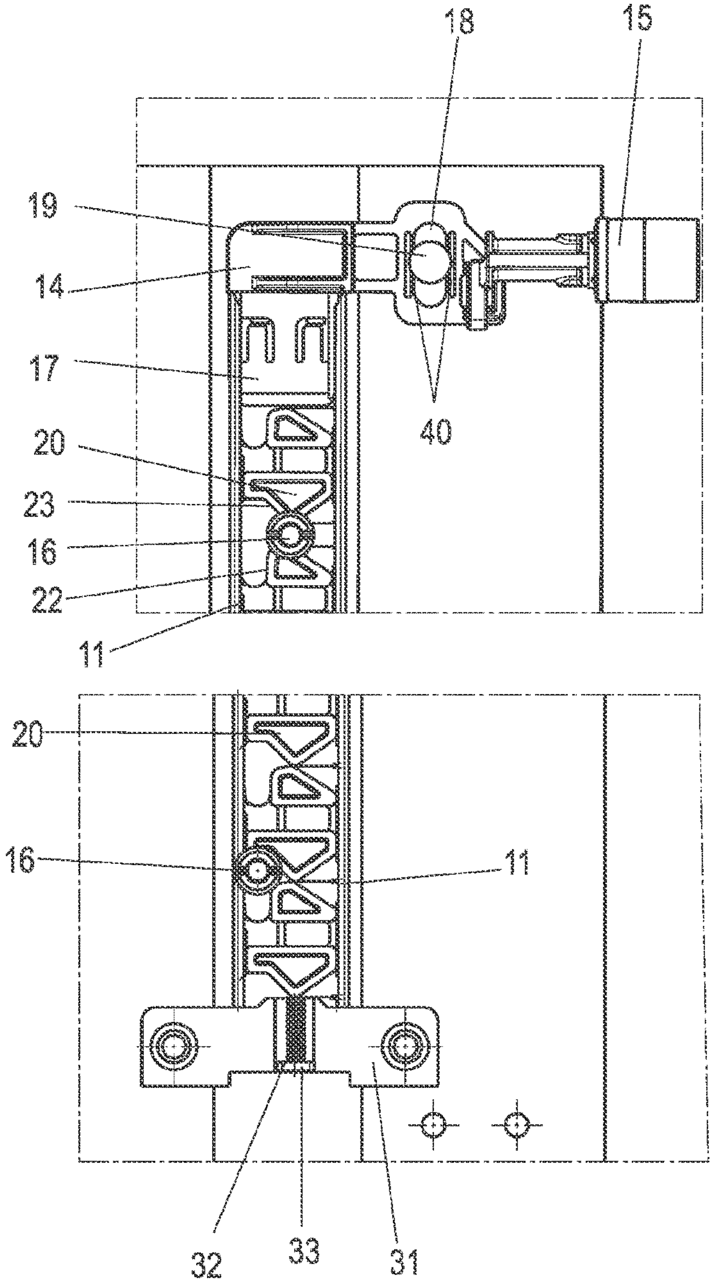
FIG. 6 a view of the locking device when moving an activator in the opening direction.

When one of the movable furniture parts 3 is moved in the opening direction, as shown in FIG. 6, the activator 16 pushes the associated blocking element 20 upwards against the run-up slope 23, which is pushed against the web 17 that is fixed to the guide rail 11. This raises the guide rail 11 so that the lower stop 30 is displaced relative to the clamp 31 together with the force accumulator 32.

The connecting element 14 is also displaced in the elongated hole 18 along the pin 19. The blocking elements 20 arranged under the activator 16 are pressed down against the force accumulator 32 so that a gap is created between two adjacent blocking elements 20 through which the activator 16 can be passed.

Figure 7:
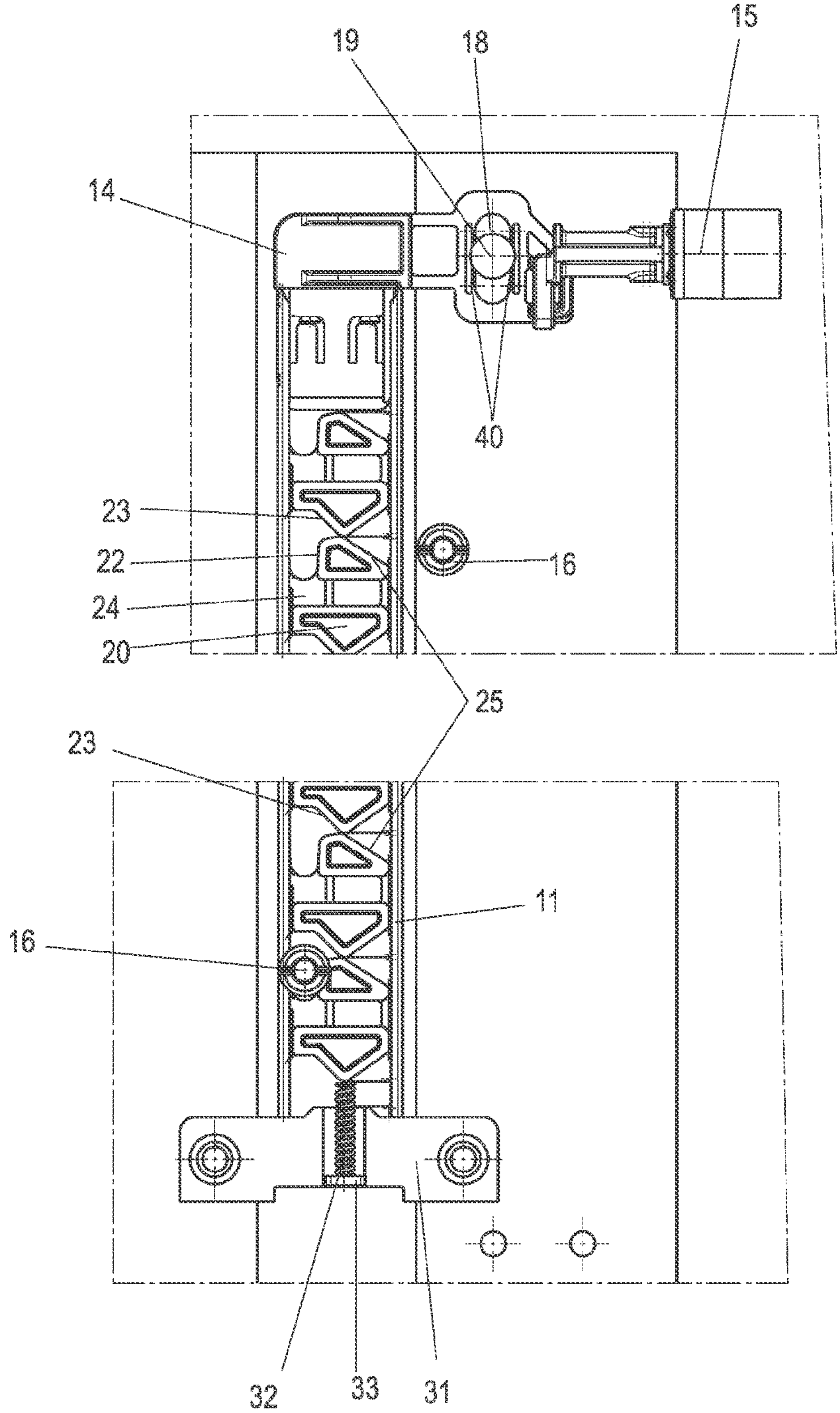
FIG. 7 a view of the locking device with the guide rail in a locked position.
Figure 8:
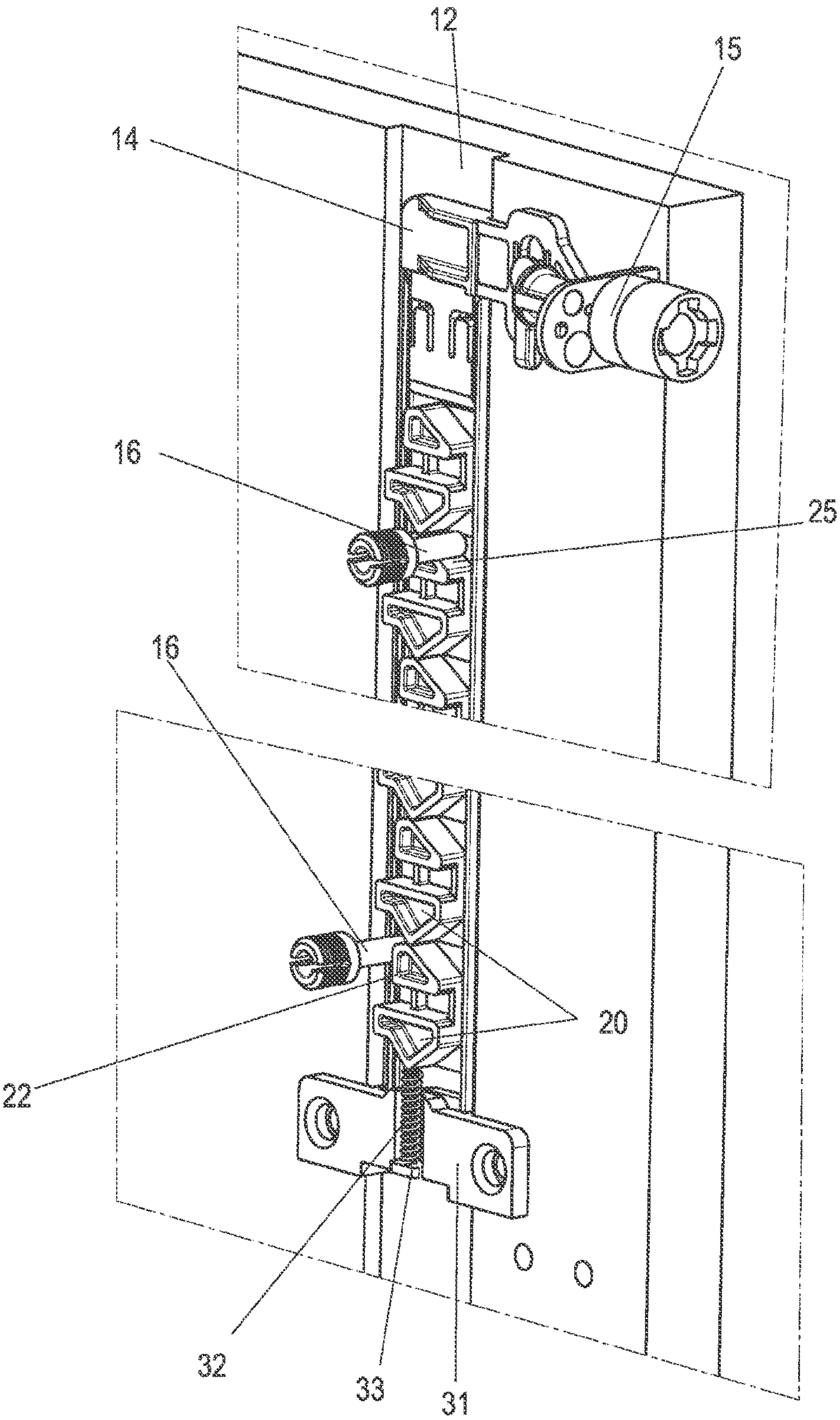
FIG. 8 a perspective view of the locking device when moving the activator against a guide slope.

The activator 16 can now be moved further in the opening direction, as shown in FIG. 7. When the activator 16 is no longer in contact with the blocking elements 20, the force accumulator 32 pushes the lower blocking elements 20 upwards to close the previously existing gap between two blocking elements 20 for the activator 16 to pass through. The guide rail 11 remains in the raised position because the connecting element 14 is held on the pin 19 by means of two clamping webs 40. Additional latching projections 41 may be formed on the clamping webs 40 to latch to the pin 19 in the blocking position of the guide rail 11. In the raised blocking position of the guide rail 11, the activators 16 of the other movable furniture parts 3 are located in the closed position adjacent to a wall 22, which block a movement of the activator 16 and thus also of the movable furniture part 3 connected thereto in the opening direction. All other movable furniture parts are thus blocked in the closed position and only the furniture part 3 moved in the opening direction can be moved freely.

If the movable furniture part 3 arranged in the opening direction is moved in the closing direction, the activator 16 comes up against a guide slope 25, which is arranged on the opposite side to the run-up slope 23 in relation to the direction of movement of the activator 16. In addition, the guide slope 25 is inclined in the opposite direction, thus pushing the blocking elements 20 downwards and not upwards like the run-up slope 23. The activator 16 contacts the guide bevel at the blocking element 20 and presses all blocking elements 20 below the activator 16 downwards against the force accumulator 32 to form a gap through which the activator 16 can be passed. The downward movement of the blocking elements 20 causes the force accumulator 32 to push against the stop 30, which correspondingly pushes the guide rail 11 downward, thereby releasing the latch or clamp on the guide rail 11, which is held on the pin 19. This moves the guide rail 11 from the raised locking position to a lowered position.

Figure 9:
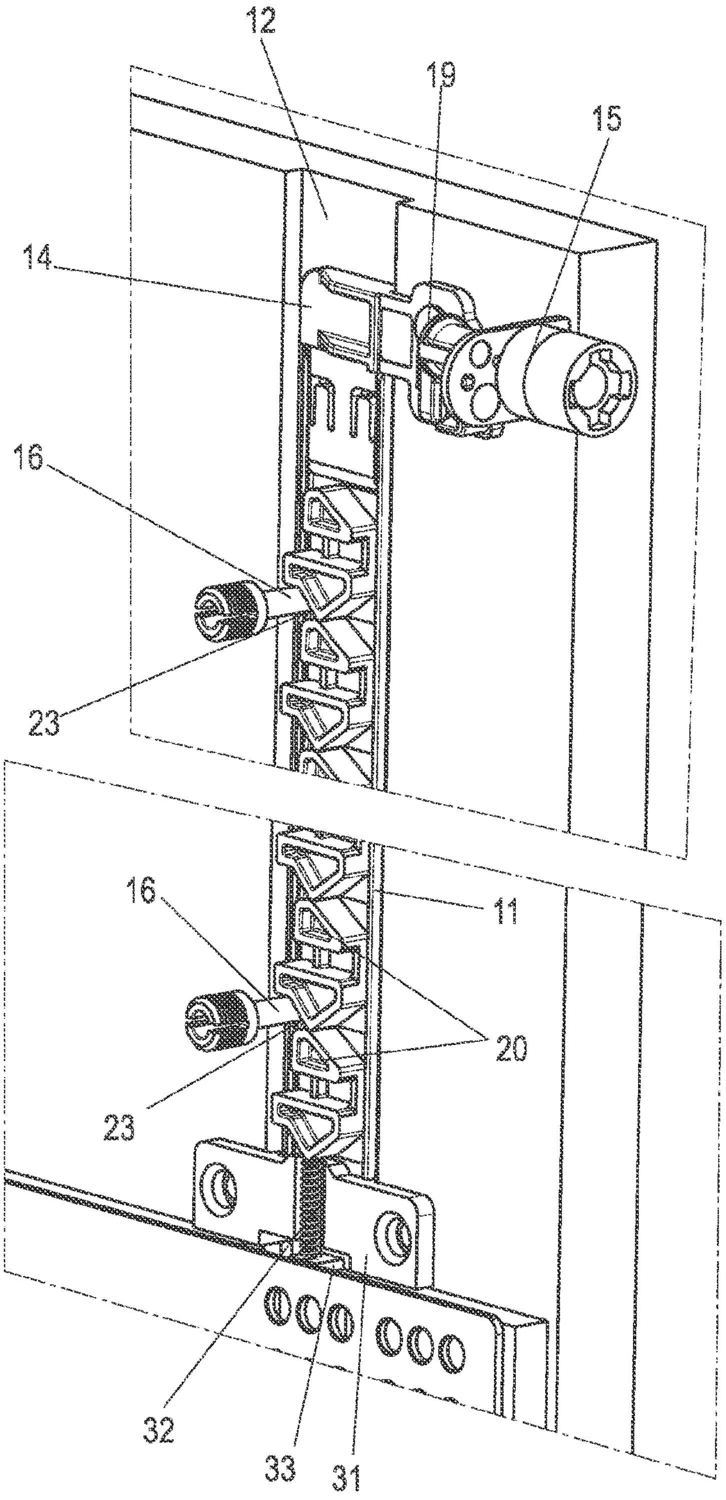
FIG. 9 a view of the locking device in the anti-tipping position.

FIG. 9 shows the anti-tip position which is reached again when the activator 16 has moved the locking elements 20 downwards by moving against the force accumulator 32 and the guide rail 11 has moved from the raised blocking position to the lowered anti-tip position. This position corresponds to FIG. 5A.

Figure 10:
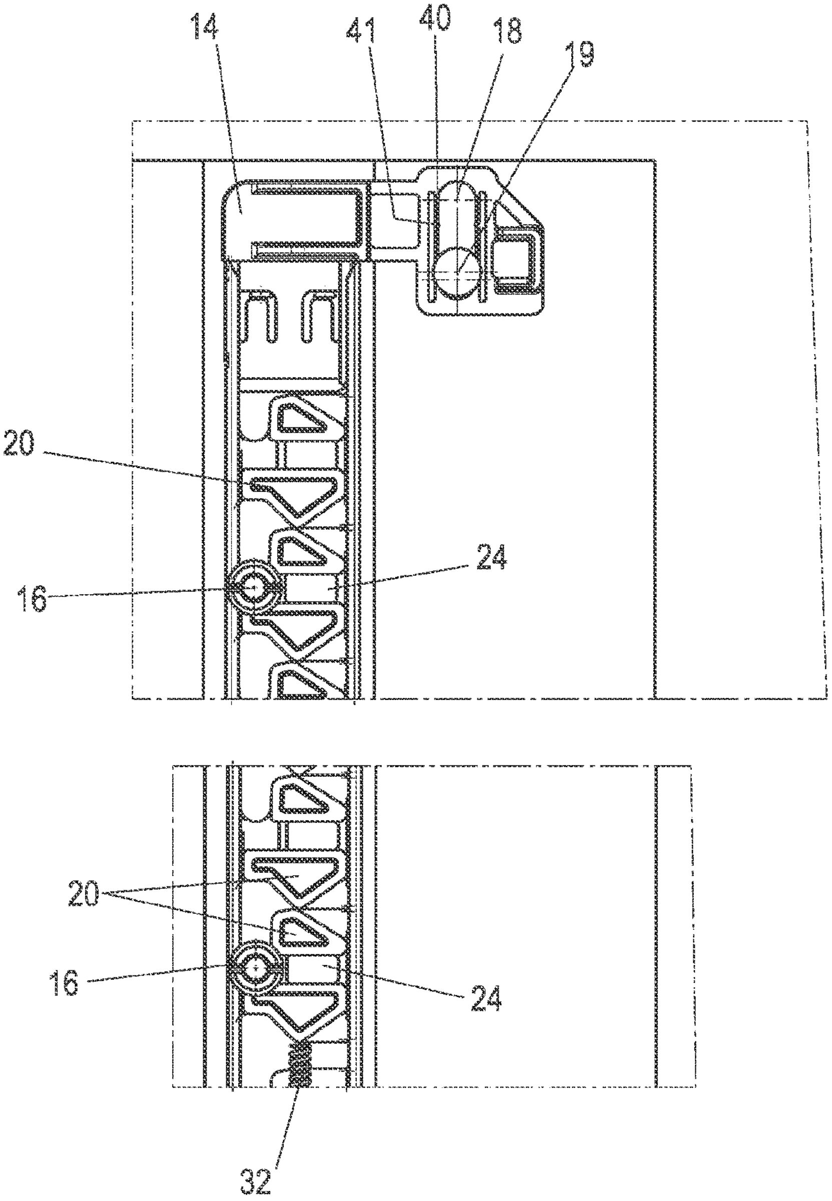
FIG. 10 a view of the locking device in a release position.

FIG. 10 shows a further position of the locking device 10 in which it is in a release position. Via the switching mechanism 15, the connecting element 14 has been raised to such an extent that all activators 16 are arranged adjacent to a channel-shaped receptacle 24 formed on each blocking element 20. Each activator 16 can now be easily moved through the channel-shaped receptacle 24 in the opening direction. This allows all movable furniture parts 3 to be moved in the opening direction, for example in order to remove and dismantle the movable furniture parts 3.

Figure 11:
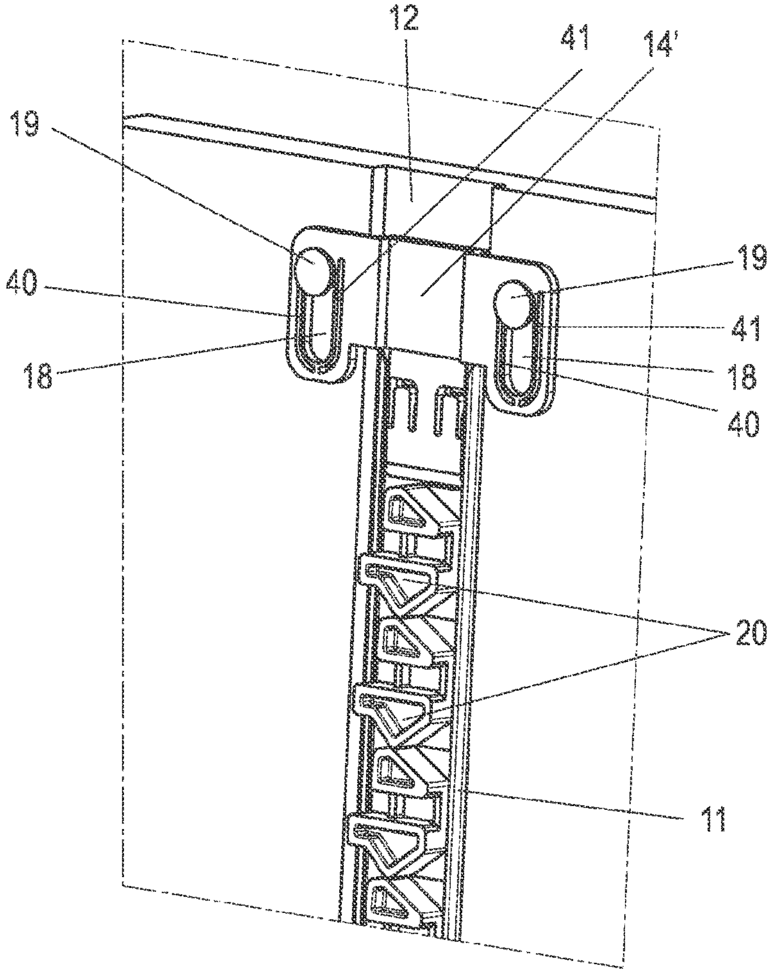
FIGS. 11 to 13 several views of modified locking devices.

FIG. 11 shows a locking device with a modified connecting element 14', in which an elongated hole 18 is provided on opposite sides of the connecting element 14', which is guided on a pin 19. Clamping webs 40 are provided on each elongated hole 18, which have a latching projection 41. By guiding the connecting element 14' on both sides, the guide rail 11 can be better guided and locked in the raised locking position. In the previous embodiment example, only one pin 19 was provided on the connecting element 14 to fix it in the raised position.

Figure 12:
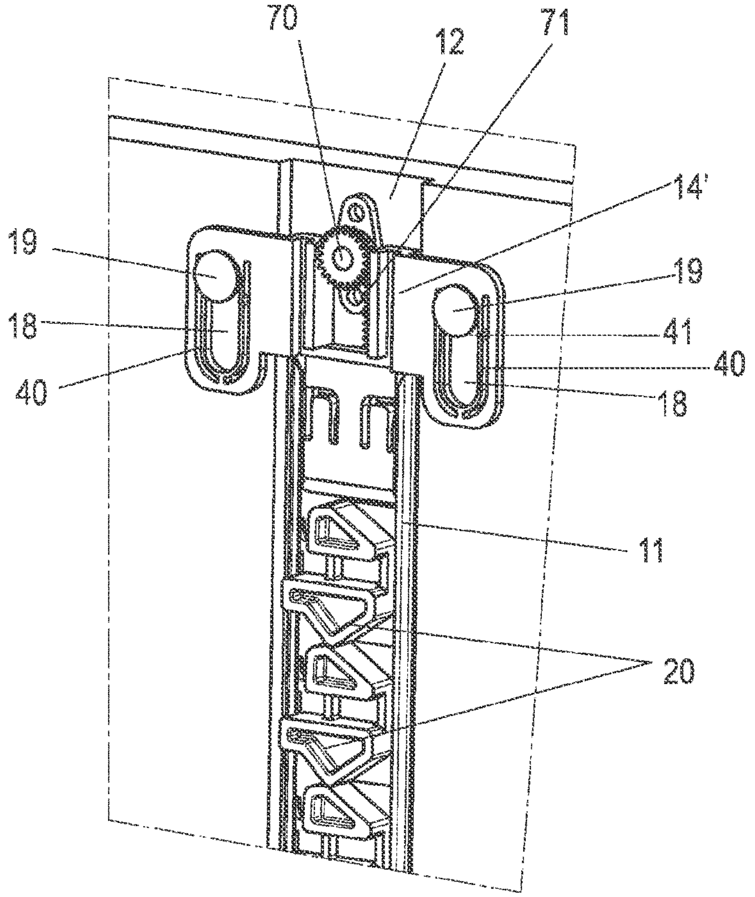

FIG. 12 shows a modified design of the connecting element 14', in which a rack 71 is additionally provided in a central area, which is in engagement with a rotary damper 70 with a pinion. The rotary damper 70 is fixed in the groove 12 on the side wall of the furniture body 2. This allows a movement of the guide rail 11 relative to the furniture body to be slowed down. Alternatively or additionally, latching devices or other holding means can also be provided on the rotary damper 70 in order to fix the guide rail 11 in the raised position if required.

Figure 13:
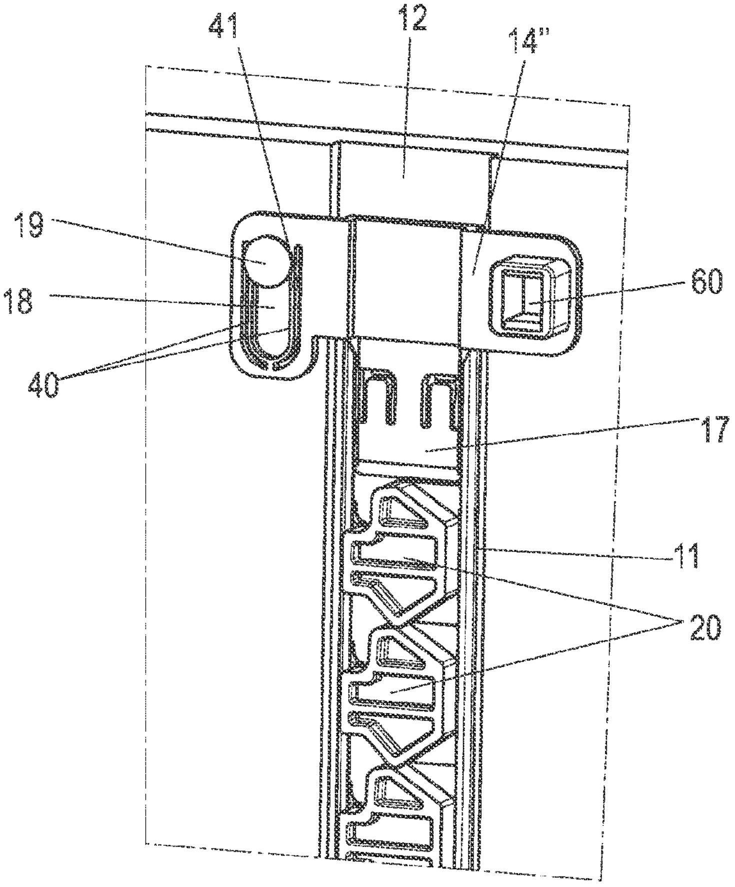

FIG. 13 shows another embodiment of the locking device 10 with a modified connecting element 14", which comprises an elongated hole 18 with a pin 19 on one side, as described in the previous embodiments. On the opposite side, a connector 60 is formed which can be connected to a lock or another component.

Figure 14:
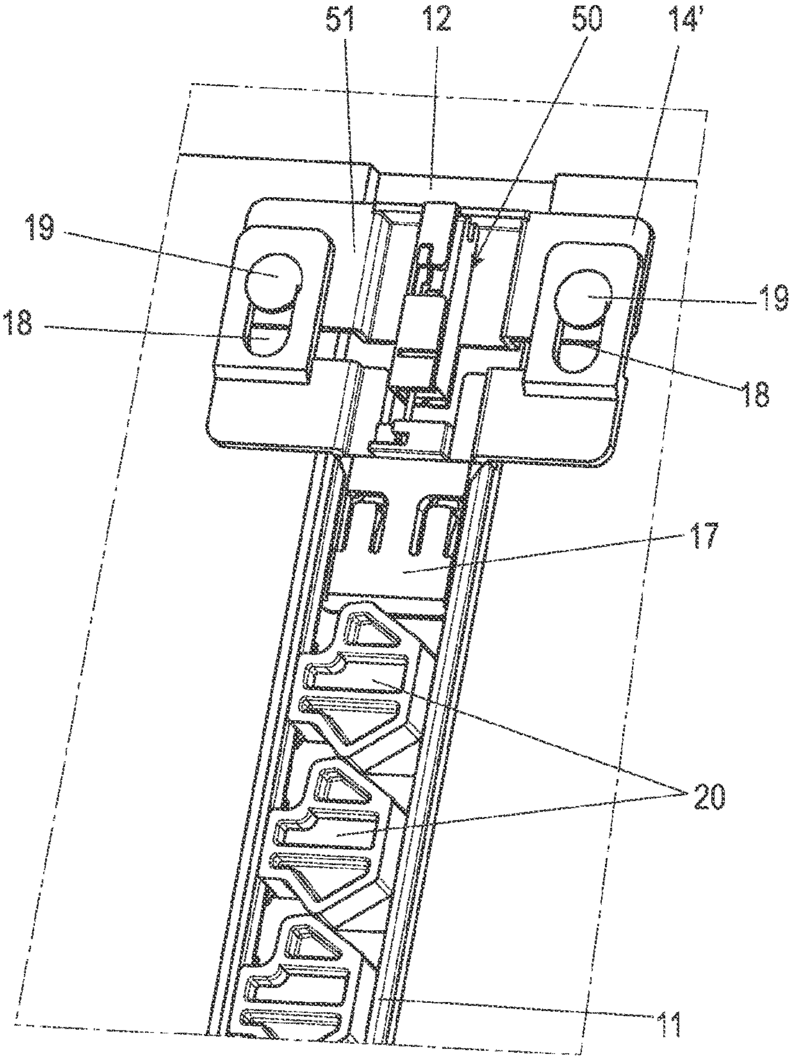
FIGS. 14 a view of a further embodiment of a locking device with a latching mechanism for holding the guide rail.
Figure 15:
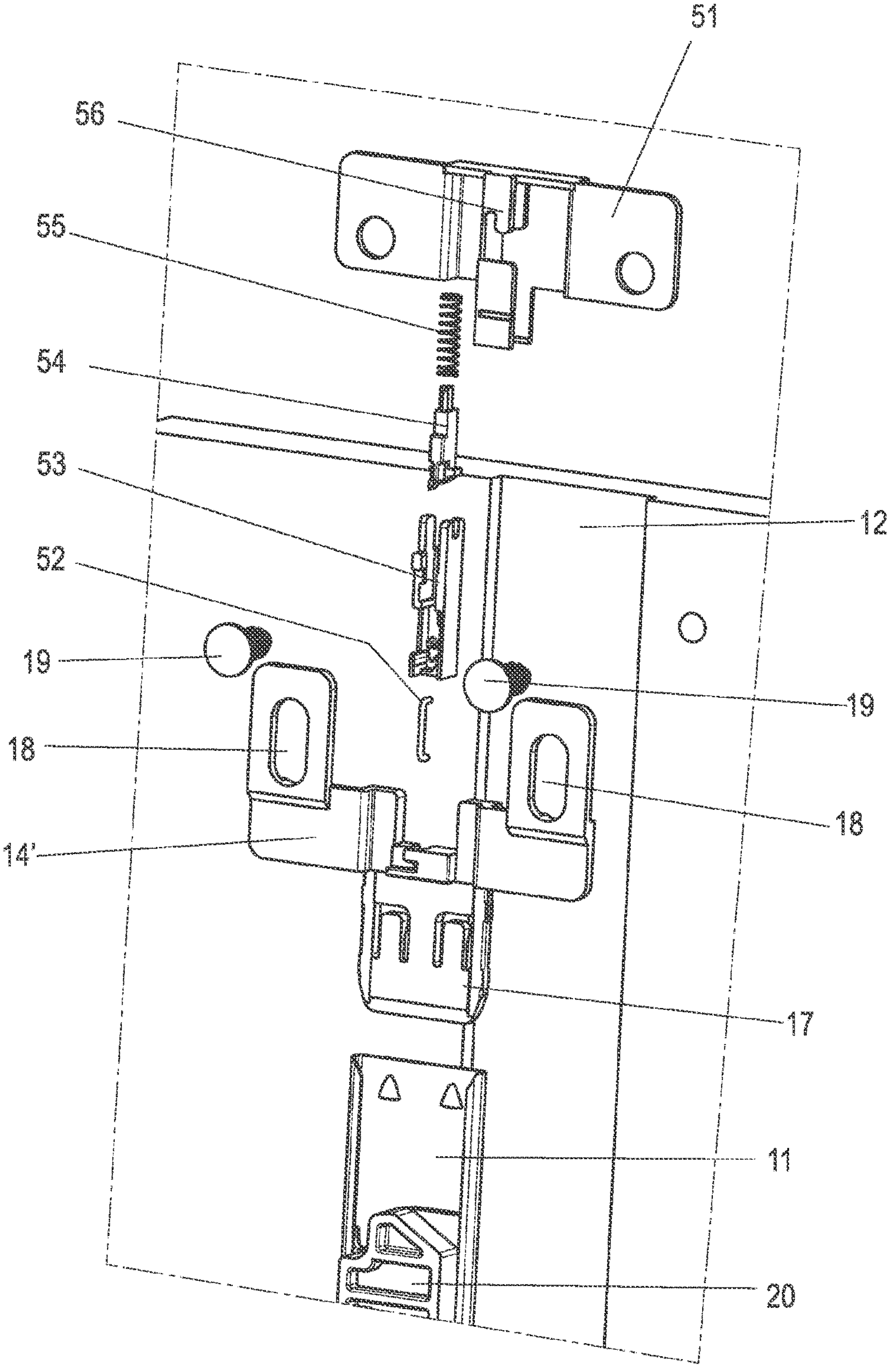
FIG. 15 an exploded view of the locking device of FIG. 14.

In FIGS. 14 and 15, the locking device 10 is shown with an additional latching mechanism 50 comprising a holder 51 fixed to the furniture body for latching the guide rail 11 in the raised blocking position. As shown in FIG. 15, the latching device 50 comprises a control element 52 which is connected to the connecting element 14'. The control element 52 is movable in a housing with a curve guide 53 and acts on a pestle 54 which is biased towards the guide rail 11 by a spring 55. The spring 55 is inserted on a housing 56 of the holder 51. The latching mechanism can latch the control element 52 to the curve guide 53, for example by configuring the curve guide as a heart curve with a latching receptacle to which a portion of the control element 52 can be latched against the force of the spring 55. Other latching mechanisms can also be used to latch the guide rail 11.

Figure 16:
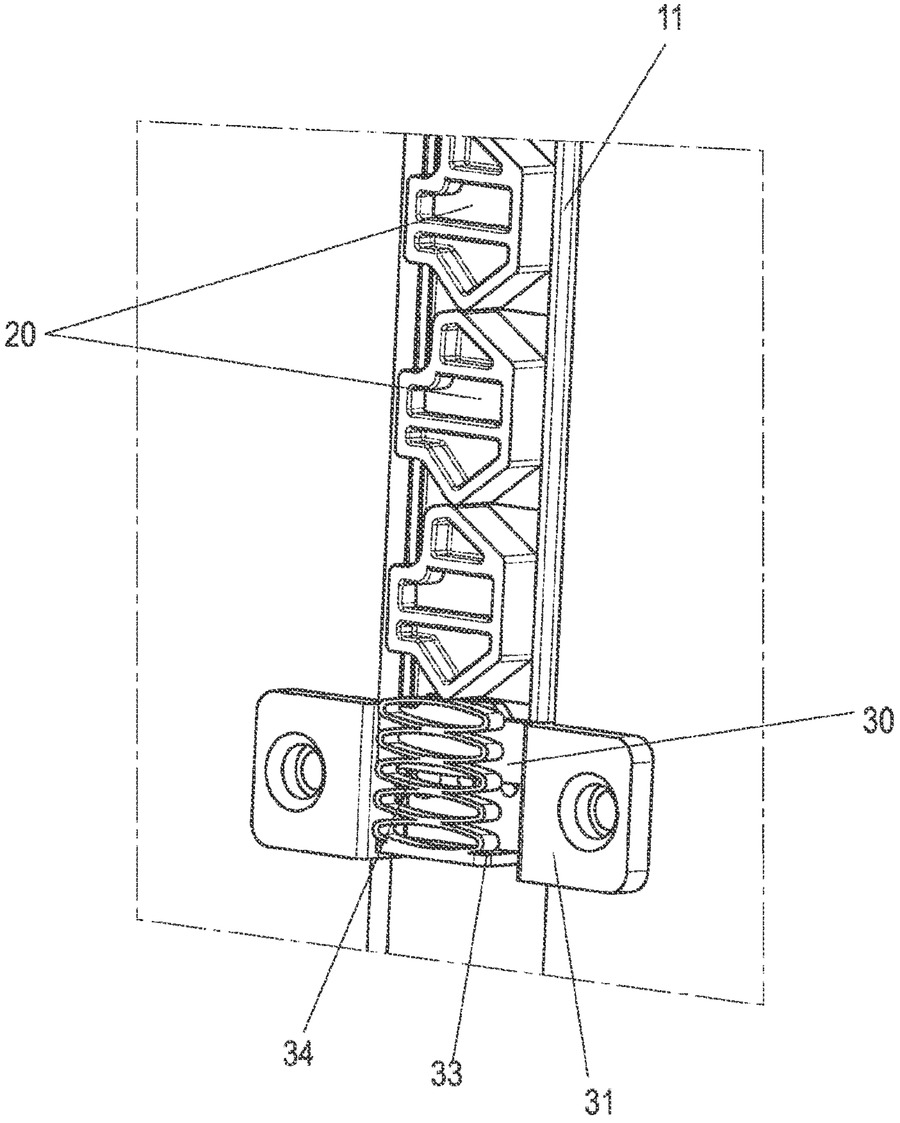
FIG. 16 a view of a modified locking device.

In FIG. 16, the guide rail 11 is shown in a lower area in which a force accumulator 34 is used instead of a separate force accumulator 32, which is integrally formed with the web 33 of the stop 30. This allows the integrally formed force accumulator 34 to support the locking elements 20, which can move against the force accumulator 34 if one of the activators is to be moved between two blocking elements 20.

In the embodiment example shown, only two movable furniture parts 3 are provided as pushing elements, each of which moves an activator 16. It is of course possible to use the locking device 10 for more than two movable furniture parts 3.

The locking device 10 can be moved to at least one of the three positions, namely the anti-tipping position, the locking position and/or the release position, via a single switching mechanism 15. It is also possible to switch the release position via a separate lever or actuating element, so that only the locking position and the anti-tipping position can be set via the switching mechanism 15.

LIST OF REFERENCE SIGNS

1 Furniture
2 Furniture body
3 Movable furniture part
4 Pull-out guide
5 Stationary rail
6 Movable rail
7 Self-closing device
10 Locking device
11 Guide rail
12 Groove
13 Spacer
14, 14', 14" Connecting element
15 Switching mechanism
16 Activator
17 Bridge
18 Elongated hole
19 Pen
20 Blocking element
22 Wall
23 Run-up slope
24 Receptable
25 Guide slope
30 Stop
31 Clamp
32 Force accumulator
33 Web
34 Force accumulator
40 Clamping web
41 Latching projection
50 Latching mechanism
51 Holder
52 Control element
53 Curve guide
54 Pestle
55 Spring
56 Housing
60 Connector
70 Rotary damper
71 Rack

The invention claimed is:

1. A locking device (10) for movable furniture parts (3), comprising:

a guide rail (11) with a plurality of blocking elements (20) that are held displaceably along the guide rail (11), wherein each said blocking element (20) comprises a run-up slope (23) which is configured to be contacted by an activator (16) attached to a movable furniture part (3) and each said blocking element (20) comprises a wall (22) which is configured to form a stop for the activator (16) in order to lock the movable furniture part (3) with the activator (16) in a closed position, wherein the guide rail (11) with the blocking elements (20) is configured to be moved between an anti-tipping position, in which all said activators (16) are arranged adjacent to the run-up slope (23) on different said blocking elements (20), and a blocking position in which all said activators (16) arranged in the closed position are arranged adjacent to the wall (22) on different said blocking elements (20), wherein, in the anti-tipping position, when one said activator (16) is moved against the adjacent run-up slope (23), the guide rail (11) is displaceable into the blocking position and is held in the blocking position by a holding device (40, 41, 50).

2. The locking device according to claim 1, wherein the holding device (40, 41, 50) holds the guide rail (11) in the blocking position in a form-locking and/or force-locking manner.

3. The locking device according to claim 1, wherein the guide rail (11) is movable from the blocking position into the anti-tipping position via one of the activators (16), which is movable along a guide slope (25) on one of the blocking elements (20).

4. The locking device according to claim 3, wherein the guide slope (25) of each said blocking element is arranged on a side of the blocking element (20) opposite the run-up slope (23).

5. The locking device according to claim 3, wherein the locking elements (20) are biased into a raised position by a force accumulator (32).

6. The locking device according to claim 5, wherein during a movement of the guide rail (11) from the blocking position into the anti-tipping position, at least a part of the blocking elements (20) can be moved into a lowered position against the force accumulator (32) by one said activator (16) which is movable along the guide slope (25).

7. The locking device according to claim 5, wherein a lower stop (30) is fixed to the guide rail (11), on which the force accumulator (32) is supported, which supports the blocking elements (20) on an opposite side.

8. The locking device according to claim 1, wherein a latching mechanism (50) or a latching element (41) is provided and is configured to latch the guide rail (11) in a raised position.

9. The locking device according to claim 1, wherein each said blocking element (20) comprises a channel-shaped receptacle (24) through which one of the activators (16) can be moved from a closed position in an opening direction without displacing the blocking elements (20).

10. The locking device according to claim 1, wherein each said activator (16) is designed as a pin which is configured to be fixed to a movable furniture part (3).

11. The locking device according to claim 1, wherein the locking device (10) comprises at least one switching mechanism (15), by means of which the guide rail (11) can be moved between the blocking position, the anti-tipping position and a release position.

12. A method for locking at least one movable furniture part (3) to a furniture body (2) with a locking device (10), wherein a plurality of said movable furniture parts (3) are held on the furniture body (2), comprising the following steps:

moving a first furniture part (3) from a closed position into an open position, wherein an activator (16) held on the first furniture part (3) is moved against a run-up slope (23) on a blocking element (20) of a plurality of blocking elements which are held on a guide rail (11) and the blocking element (20) moves the guide rail (11) from an anti-tipping position into a locking position in which all the other movable furniture parts (3) are locked in the closed position;

holding the guide rail (11) in the locking position by a holding device (40, 41, 50), wherein the blocking elements (20) block a movement of at least a second furniture part (3) from the closed position in an opening direction;

moving the first furniture part (3) into the closed position, wherein the activator (16) on the first furniture part (3) is moved against a guide slope (25) of the blocking element (20) in order to move the guide rail (11) from the locking position into the anti-tipping position, in which one of the movable furniture parts (3) can be moved in the opening direction.

13. The method according to claim 12, wherein, when the activator (16) of the first furniture part (3) moves against the run-up slope (23), at least some of the blocking elements (20) are displaced against a force accumulator (32) along the guide rail (11).

14. The method according to claim 12, wherein when the activator (16) is moved by the first furniture part (3) against the guide slope (25), the blocking elements (20) are first displaced along the guide rail (11) against a force accumulator (32) and then the guide rail (11) is displaced from the locking position into the anti-tipping position.

15. The method according to claim 12, wherein at least some of the blocking elements (20) are displaced along the guide rail (11) by the activator (16) during a movement against the run-up slope (23) or the guide slope (25) in order to form a gap between two said blocking elements (20), through which the activator (16) is then passed, wherein the force accumulator (32) after the activator (16) is disengaged from the blocking elements (20) automatically moves the blocking elements (20) again to a closed position and the gap created by the activator (16) is closed.

* * * * *